United States Patent [19]

Ishida et al.

[11] 4,234,255
[45] Nov. 18, 1980

[54] COMBINED MOTOR MEANS AND ROTATIONAL CELL

[75] Inventors: Kozo Ishida; Hiroyuki Amimoto; Osamu Saitoh, all of Miyanohigashi, Japan

[73] Assignee: Horiba, Ltd., Kyoto, Japan

[21] Appl. No.: 950,610

[22] Filed: Oct. 12, 1978

[30] Foreign Application Priority Data

Oct. 15, 1977 [JP] Japan .................. 52-123798

[51] Int. Cl.³ .............................................. G05D 25/00
[52] U.S. Cl. ..................... 350/274; 356/246; 356/51
[58] Field of Search ......... 350/274; 356/246; 250/343, 339, 344, 345, 346, 350; 36/51, 188, 189; 200/19 M, 27 R, 27 A

[56] References Cited

U.S. PATENT DOCUMENTS

| | | | |
|---|---|---|---|
| 3,729,264 | 4/1973 | Simazaki et al. | 350/274 |
| 3,793,525 | 2/1974 | Burch et al. | 250/343 |
| 3,860,344 | 1/1975 | Garfunkel | 356/51 |
| 3,904,880 | 9/1975 | Benz et al. | 250/343 |

*Primary Examiner*—John K. Corbin
*Assistant Examiner*—B. Wm. de los Reyes
*Attorney, Agent, or Firm*—Wenderoth, Lind & Ponack

[57] ABSTRACT

A combined motor and rotational cell for use in an apparatus for measuring components in a gas colorimeter, smoke meter, etc. by utilizing light absorption or fluorescence. The combined motor and rotational cell has a motor with a plurality of magnetic poles around the periphery of thereof, at least one diametrically extending partition wall extending across the hollow interior for defining at least two compartments in the rotor, and optically transparent windows on the outside of the motor closing the compartments. A plate-shaped chopper is provided on one side of the rotor having a plurality of apertures therein equidistantly spaced around the chopper. A casing surrounds the rotor and supports the rotor shaft in bearings and has a plurality of coils around the inside of the peripheral wall opposed to the magnetic poles on the rotor. Apertures are provided in the opposite end walls of the casing aligned with the compartments in the rotor for passing light through the casing and the rotor.

3 Claims, 10 Drawing Figures

COMBINED MOTOR MEANS AND ROTATIONAL CELL

The present invention relates to a combined motor means and rotational cell for use in modulation of light in an optical measuring or analyzing system which utilizes light absorption or fluorescence, and the invention particularly relates to a combined motor means and a correlative rotational cell used for the measurement of components present in very small quantities in a gas by utilizing light (such as, infrared ray, ultraviolet ray and visible ray) absorption or fluorescence.

BACKGROUND OF THE INVENTION AND PRIOR ART

Correlative rotational cells, which have heretofore been used for carrying out a method of correlative analysis or fluorescence analysis, are usually driven by a synchronous motor or the like, either directly or indirectly, as shown in FIGS. 1a and 1b, in order to rotate the cell at a high speed. In the structure shown in FIG. 1(a), a correlative rotational cell $C_1$ is directly mounted on the shaft $S_1$ of a motor $M_1$ having a rotor R within it. This is an example of an arrangement in which the cell is directly rotated by the motor and the structure is clearly rather simple. However, it is a disadvantage of this type of structure that sometimes optical noises occur due to the oscillation of the shaft. Further, in the arrangement of FIG. 1(b), the rotational shaft $S_2$ of a motor $M_2$ and the shaft $S_3$ of a rotational cell $C_2$ are positioned parallel to each other and pulleys $P_1$ and $P_2$ which are mounted on the corresponding shafts $S_2$ and $S_3$ are connected by a driving belt B. This arrangement is an example in which the cell is directly rotated by the motor. The disadvantages of this type of structure are that it is rather complicated and moreover, sometimes, noises appear due to the inconsistency of the rotational motion, originating from the system of power transmission.

OBJECT AND BRIEF SUMMARY OF THE INVENTION

The present invention has as its object to provide a combined motor means and a correlative rotational cell, which completely overcomes the disadvantages described above. This object is achieved, according to the invention, by the provision of a combined motor means and rotational cell comprising: a rotor having a hollow cylindrical body, a plurality of magnetic poles around the periphery of said body, at least one diametrically extending partition wall extending across the hollow interior of said body for defining at least two compartments in said body, and optically transparent windows on the outside of said body closing said compartments; a rotor shaft mounted on said wall; and a casing around said rotor having a peripheral wall and opposite end walls, bearings in said end walls in which said rotor shaft is rotatably mounted, a plurality of coils mounted around the inside of the peripheral wall of said casing opposed to said magnetic poles on said rotor, and apertures in the opposite end walls aligned with the compartments in said rotor for passing light through the casing and the rotor.

BRIEF DESCRIPTION OF THE FIGURES.

The invention will now be described in detail, with reference to the attached drawings, in which.

DETAILED DESCRIPTION OF THE INVENTION

Figure 1A:
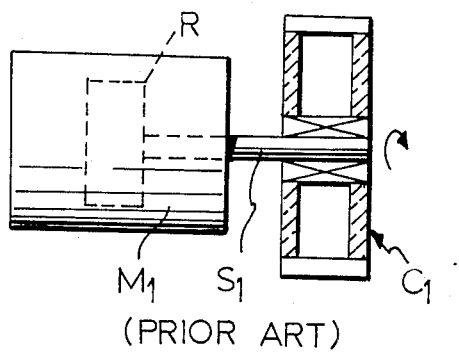
FIGS. 1(a) and (b) are schematic diagrams of correlative rotational cells of the prior art.
Figure 1B:
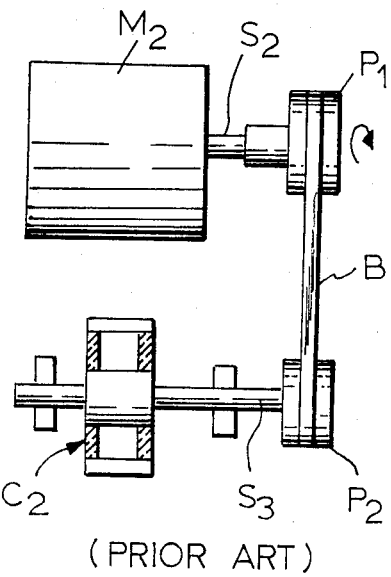
Figure 2:
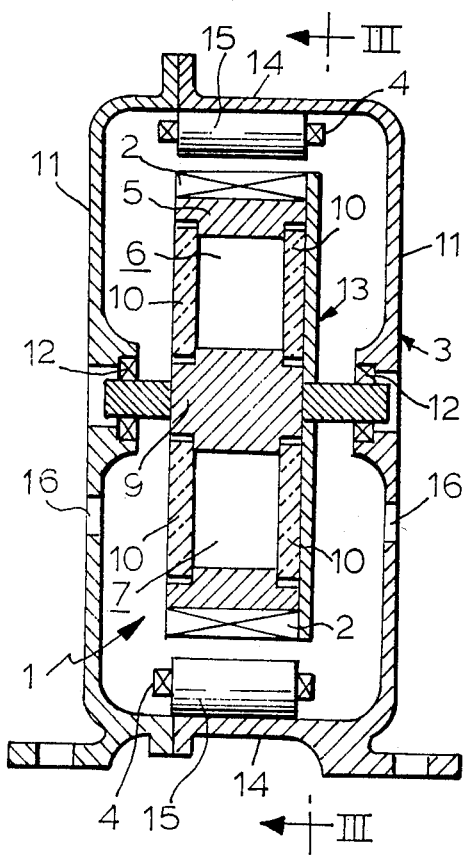
FIG. 2 is an axial sectional view of a combined motor means and correlative rotational cell according to the present invention.
Figure 3:
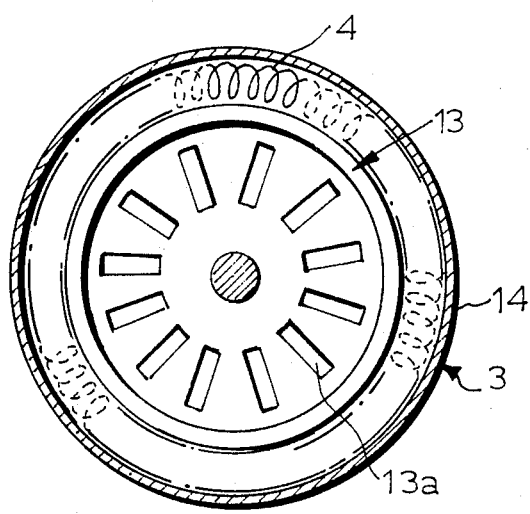
FIG. 3 is a transverse sectional view of the combined motor means and cell shown in FIG. 2, taken along the line III—III.
Figure 4:
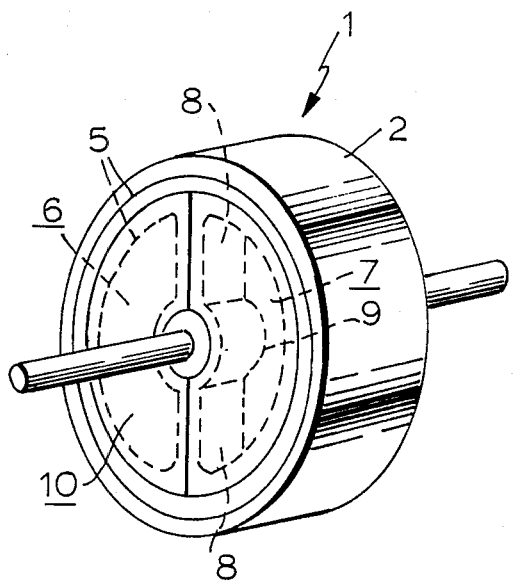
FIG. 4 is a perspective view of a rotor for the motor means and cell of FIG. 2.
Figure 5:
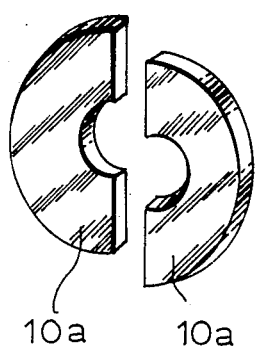
FIG. 5 is a perspective view of a window for the motor means and cell shown in FIG. 2.
Figure 6:
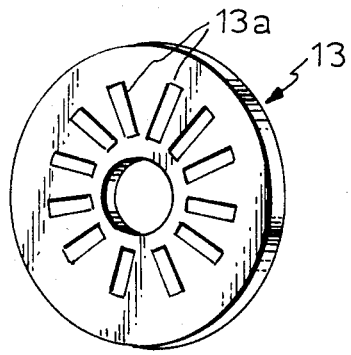
FIG. 6 is a perspective view of a chopper for the motor means and cell of FIG. 2.

FIG. 2 and FIG. 3 show a combined motor means and correlative rotational cell according to the present invention, wherein the motor means is composed of a rotor 1 having magnetic poles 2 around the periphery thereof (see, also, FIG. 4), a case 3 and coils 4 on the inside wall of the case for the generation of a rotating magnetic field. As shown in FIG. 4, the rotor 1 has a cylindrical body 5, a diametrically extending partition wall 8 which defines compartments 6 and 7 within the cylindrical body 5 and an axial shaft 9 mounted on the wall 8. On opposite sides of the cylindrical body 5 are optically transparent windows 10 which are fitted on the body 5 to close the compartments 6 and 7 tightly. Each optically transparent window 10 has two halves 10a and 10b, as shown in FIG. 5; and they are fitted around the shaft 9 and join each other tightly to form the window 10. The magnetic poles 2 are mounted on the outer peripheral surface of the cylindrical body 5. Both ends of the shaft 9 of the rotor 1 are supported by bearings 12 and 12 provided at the central portions of side walls 11 and 11 of the case 3. On one side of the rotor 1 is mounted a chopper 13 having a plurality of windows 13a therein for interrupting light rays intermittently as the rotor rotates. If the chopper 13 is made of a ferro-magnetic material, it is possible to increase the torque generated by the rotor 1. The chopper can be made by evaporating or spattering a metal or nonmetal which interrupts light rays on one or the other of the optically transparent windows 10, 10.

Mounted on the inside of the peripheral wall 14 of the case 3 is mounted a core 15, and the coil 4 are wound around the core 15. In the two side walls 11 of the case 3 are holes 16 which are aligned with each other to pass light rays through the case 3 and rotor 1.

The poles 2, core 15 and winding 4 can be arranged so as to constitute a synchronous motor or an induction motor.

The use of the compartments 6 and 7 of the combined motor means and cell of the present invention as described above will be described in two examples.

When only one gaseous component is desired to be measured, into either of the compartments 6 and 7 is placed a gas which does not absorb light having a wavelength in the region of the wavelength of light absorbed by the gaseous component to be tested for (for example, a zero absorption gas such as nitrogen) and into the other compartment is placed a gas which is the same as the gaseous component to be measured or is equivalent to said component. The combined motor means and cell is then placed in an analyzer as shown in FIG. 7 and the analyzer is operated in the conventional way.

Figure 7:
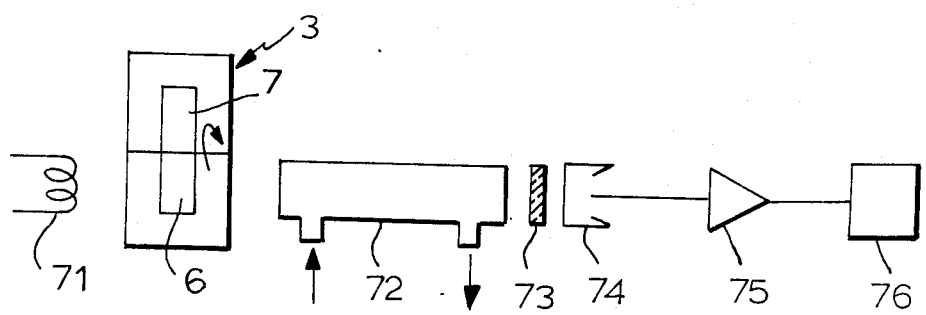
FIG. 7 is a diagram of practical example of an analyzer for the measurement of the concentration of gas and which uses a combined motor means and cell of the present invention for optical modulation.

In FIG. 7, the analyzer has a light source 71 directing light through the combined motor means and cell, through a sample cell 72 through which a sample gas is passing, an interference filter 73, and onto a detector 74. An amplifier 75 amplifies the detected signals and feeds them to a recorder 76.

Alternatively two gaseous samples are first prepared by diluting a gas which is the same kind of a gas as the gaseous component to be measured, or is equivalent thereto, with a zero absorption gas such as nitrogen gas to two different degrees of dilution, and then, they are enclosed in the separate compartments. The combined motor means and cell is then placed in the analyzer in the same manner as described above. When multiple components are desired to be measured, a gas which does not absorb light having a wavelength in the region of the wavelength of light absorbed by the gaseous components to be measured (for example, a zero absorption gas such as nitrogen) is enclosed in one of the compartments 6 and 7, and gases which are the same kind as gaseous components to be measured or are equivalent to said components are enclosed in the other compartments. The combined motor means and cell is then placed in the analyzer in the same manner as described above.

In a practical example, the analyzer of FIG. 7 can be used to measure the concentration of a gas such as carbon monoxide. Carbon monoxide is enclosed in the compartment 6 and nitrogen gas is enclosed in the compartment 7 of the combined motor means and cell.

Figure 8:
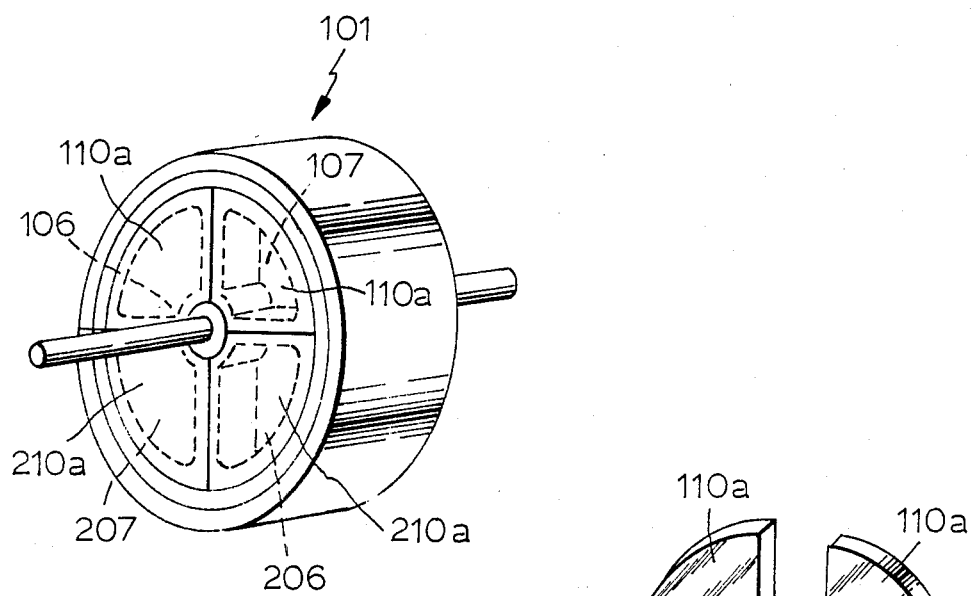
FIG. 8 is a perspective view of a second embodiment of a rotor for the motor means and cell of the present invention.

FIG. 8 shows the structure of a different embodiment of a rotor which is used for the measurement of two gaseous components such as carbon monoxide and methane. In rotor 101 are two pairs of compartments, compartments 106 and 107 and compartments 206 and 207. The number of gaseous components to be measured and the number of pairs of compartments correspond to each other; that is, three pairs of compartments will be provided when three gaseous components are to be measured, four pairs of compartments will be provided when four gaseous components are to be measured and so on. In the present example, carbon monoxide is enclosed in the compartment 106 and a gas which does not absorb light having a wavelength in the region of the wavelength of light absorbed by carbon monoxide (for example, a zero absorption gas such as nitrogen) is enclosed in the compartment 107. Methane is enclosed in the compartment 206 and a gas which does not absorb light in the region of the wavelength of light absorbed by methane (for example, a zero absorption gas such as nitrogen) is enclosed in the compartment 207.

Figure 9:
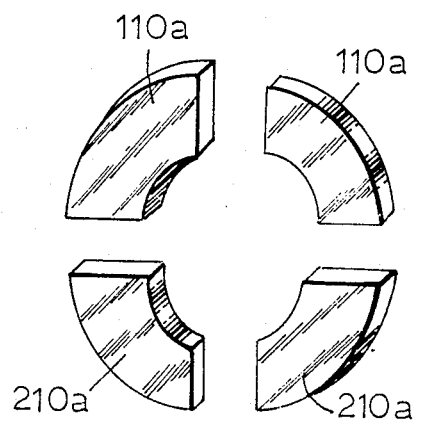
FIG. 9 is a perspective view of an optically transparent window for use with the rotor shown in FIG. 8.

Furthermore, a solid interference filter, which permits only infrared rays having wavelengths within a narrow range in which the characteristic absorption by each gas to be measured takes place, is mounted on each compartment. In the present example, four such filters in the form of windows 110a, 110b, 210a, 210b in the shape of four quadrants of an annulus, as shown in FIG. 9, are mounted over the openings to the compartments 106, 107, 206 and 207 respectively. The filters 110a and 110b, and the filters 210, and 210b are two kinds of solid interference filters corresponding to said two gaseous components to be measured. It is, of course, possible to provide each solid filter as a separate member which is placed over the window for the corresponding compartment.

As described above in detail, since the main point of the present invention is to provide a structure which plays two roles, that is, the role of a correlative rotational cell and the role of a motor, it is possible to suppress the optical noise due to the undesirable vibration of the shaft and also to the lack of consistency in its rotation, which were inevitable in the prior apparatus. Moreover, the mechanism is simple and accordingly, it is possible to manufacture the combined cell and motor in a compact size. Thus, the invention makes it possible to provide an optical system having superior functional characteristics at a low cost.

What is claimed is:

1. A combined motor rotor and correlative rotational cell, for use in a single sample cell type apparatus for measuring components in a gas, said combined motor rotor and correlative rotational cell comprising:
    a rotor having a hollow cylindrical body with a plurality of magnetic poles extending around the periphery thereof, said rotor having at least one diametrically extending partition wall extending across the hollow interior of said body for dividing said body into at least two compartments for containing specified gases therein and the end walls of said body being optically transparent windows;
    rotor shaft means mounted on the outside of said end walls of said body;
    an outer casing having a peripherally extending wall and opposite end walls, said end walls having bearing means for mounting said rotor shaft means thereon and thereby supporting said rotor within said outer casing, said outer casing further having a plurality of coils mounted around the inside of said peripherally extending wall for interacting with said poles and causing said rotor to rotate and said end walls of said outer casing having aligned apertures for passing light through said end walls of said outer casing and said rotor; and
    a light chopper mounted on one side of said rotor, said light chopper being made of ferromagnetic material for increasing the torque being exerted on said rotor.

2. A combined motor rotor and correlative rotational cell as claimed in claim 1 wherein the number of compartments in said rotor body is two.

3. A combined motor rotor and correlative rotational cell as claimed in claim 1 wherein the number of compartments in said rotor body is four.

* * * * *